United States Patent Office 3,075,998
Patented Jan. 29, 1963

3,075,998
UNSATURATED BUTYROLACTONES AND PROCESS FOR THEIR PRODUCTION
Guido Lardelli, Vlaardingen, Pauline Haverkamp Begemann, Dordrecht, and Pieter Daniel Harkes and Anthonie Simon Maria van der Zijden, Vlaardingen, Netherlands, assignors to Lever Brothers Company, New York, N.Y., a corporation of Maine
No Drawing. Filed Aug. 18, 1958, Ser. No. 755,376
Claims priority, application Great Britain Aug. 19, 1957
10 Claims. (Cl. 260—343.6)

This invention relates to new chemical compounds which are derivatives of furane, to methods of preparing these compounds and to compositions containing them.

The new compounds of the invention are lactonols and lactones having the respective general formulae:

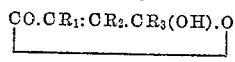

and

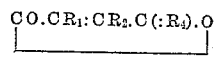

in which $R_1$ and $R_2$ are hydrogen or branched-chain or straight-chain alkyl groups containing from one to five carbon atoms, at least one of them being such an alkyl group, $R_3$ is a hydrocarbon radical, said radical being a branched or unbranched, saturated or unsaturated, cyclic or acyclic, mono- or di-substituted methyl group containing two to nine carbon atoms, not more than seven being consecutive atoms in an acyclic chain, and $R_4$ is a radical differing from $R_3$ only in that it contains one hydrogen atom less on the first carbon atom and is in consequence bi-valent, the first carbon atom being attached to the ring by a double bond. Thus $R_3$ may be for example —$CH_2.CH_3$, —$CH_2.CH_2.CH_3$, —$CH_2.(CH_2)_2.CH_3$,
—$CH_2.(CH_2)_3.CH_3$, —$CH_2.(CH_2)_4.CH_3$,
—$CH_2.(CH_2)_5.CH_3$, —$CH(CH_3).CH_2.CH_3$,
—$CH.(CH_2.CH_3)_2$, —$CH_2.CH_2.CH(CH_3)_2$,

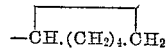

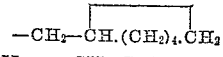

—$CH_2.CH:CH.CH_3$, —$CH_2.C_6H_5$, —$CH_2.CH_2.C_6H_5$, or —$CH_2.CH:CH.C_6H_5$.

The lactonols of the present invention may be prepared by the following methods:

(a) The appropriate alkyl-substituted maleic anhydride is reacted with the appropriate alkyl magnesium halide:

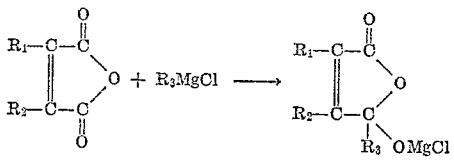

Where $R_1$, $R_2$ and $R_3$ are as defined above, and the addition compound is hydrolyzed to convert the —OMgCl group to an —OH group.

The reaction has to be carried out at low temperatures, preferably —70° C. or lower, in order to avoid the reaction of the addition compound with further molecules of the alkyl magnesium halide.

(b) The alkyl-substituted maleic anhydride is reacted with an alkyl-zinc-halide, $R_3ZnX$, or, preferably a dialkyl-cadmium, $R_3CdR_3$, and the resulting addition product is hydrolyzed to convert the metal-organic group to an —OH group.

The lactones according to the present invention may be prepared by dehydrating the corresponding lactonol or keto acid with a suitable dehydrating agent, for example a mixture of acetic anhydride, glacial acetic acid and concentrated sulphuric acid:

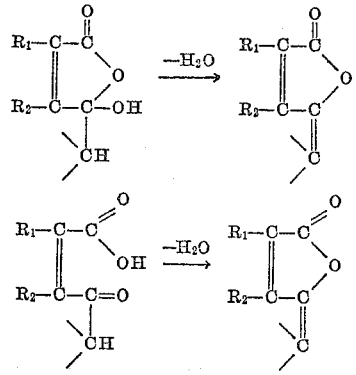

in which the radical $R_3$ defined above is represented by a CH group with two unattached bonds.

The alkyl-substituted maleic anhydrides described above may be prepared by the following methods:

(a) A beta-keto-carboxylic acid ester is reacted with sodium and an alkyl halide, the reaction product is treated with sodium cyanide and hydrochloric acid and the resulting cyanohydrin is saponified and dehydrated.

(b) A chloroketone of the formula $R_1.CO.CH(R_2)Cl$ is treated with sodium cyanide, the resulting cyano compound $R_1.CO.CH(R_2).CN$ is treated with hydrocyanic acid in the presence of acetic anhydride to form the dicyano acetic ester $CH_3.CO.O.C(R_1)(CN).CH(R_2).CN$ which is then saponified and dehydrated to form the alkyl-substituted anhydride desired.

(c) An alpha bromo carboxylic acid ester

is reacted with a beta-keto carboxylic ester,

where $R'_2$ is an $R_2$ group as defined above minus the first $CH_2$ group, to form the reaction product

which is then treated with sodium amalgam, saponified and dehydrated to the desired alkyl substituted anhydride.

Examples 1 to 7 below, in which the constitution of the lactonols and lactones concerned is defined by defining the groups $R_1$, $R_2$, $R_3$ and $R_4$ in the general formulae for these classes of substance given above, illustrate the preparation of lactonols and lactones according to the invention.

EXAMPLE 1

This example illustrates the preparation of certain 3.4-dimethyl-5-hydroxy-5-alkyl-2:5-dihydro-furane-2-ones in which the 5-alkyl group is an n-alkyl radical, and the corresponding lactones.

The starting materials used were 2.3-dimethyl-maleic anhydride and an n-alkyl magnesium bromide, the alkyl group being either ethyl-, n-propyl or its higher homologues up to n-heptyl.

150 cc. of a solution of the n-alkyl magnesium bromide in ether, containing 0.15 mol. of the bromide and having a temperature of about 20° C. was added in 1½ hour to a solution of 0.13 mol. of 2.3-dimethyl-maleic anhydride in 150 cc. toluene kept at a temperature of —70° C. The solution was kept at this temperature for one hour, after which the reaction mixture was allowed to warm up to —10° C. At this temperature 100 cc. of a 20% aqueous solution of $NH_4Cl$ were added. Two layers were obtained, an aqueous layer, which was washed once with a small quantity of toluene, and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude lactonol thus obtained was fractionated under vacuum. The pure lactonol was obtained in an amount of about 0.1 mol. and was converted into the corresponding lactone by dehydration with a mixture of acetic anhydride, glacial acetic acid and concentrated sulphuric acid.

The lactone was extracted with petroleum ether, the petroleum ether solution was washed until it gave a neutral reaction, the petroleum ether was distilled off and finally the lactone was distilled under vacuum.

The characteristics of the pure lactones and the pure lactonols are given in Table I below. In these compounds $R_1$ and $R_2$ are methyl groups and $R_3$ and $R_4$ are n-alkyl, and n-alkyidene radicals respectively, of the formulae given in column 1 of the table. The lactones of the example, in common with those of Examples 2 and 5 to 7 below, have celery like odours.

*Table I*

LACTONES

| | B. Pt., °C./mm. | $n_d^{20}$ | U.V., max. in petr. ether |
|---|---|---|---|
| $R_4$ | | | |
| $C_2H_4$ | 58/0.35 | 1.5262 | 270 |
| $C_3H_6$ | 55/0.15 | 1.5226 | 270 |
| $C_4H_8$ | 68/0.2 | 1.5176 | 270 |
| $C_5H_{10}$ | 123/0.5 | 1.5103 | 270 |
| $C_6H_{12}$ | 108/0.2 | 1.5082 | 270 |
| $C_7H_{14}$ | 93/0.1 | 1.5071 | 270 |

LACTONOLS

| $R_3$ | | | |
|---|---|---|---|
| $C_2H_5$ | 112/0.5 | | 213 |
| $C_3H_7$ | 114/0.2 | | 214 |
| $C_4H_9$ | 132/0.2 | 1.4734 | 214 |
| $C_5H_{11}$ | 134/0.2 | 1.4730 | 213 |
| $C_6H_{13}$ | 145/0.2 | 1.4719 | 211 |
| $C_7H_{15}$ | 155/0.2 | 1.4711 | 215 |

EXAMPLE 2

This example illustrates the preparation of 3,4-dimethyl-5-alkyl-2,5-dihydro-furane-2-ones in which the 5-alkyl group is a branched acyclic group or a cyclo-alkyl group, and the corresponding lactones.

The starting materials used were 2,3-dimethyl-maleic anhydride and an alkyl magnesium bromide, the alkyl group corresponding with any one of the above-mentioned alkylidene groups.

150 cc. of a solution of the alkyl magnesium bromide in ether, containing 0.15 mol. of the bromide and having a temperature of about 20° C. was added in 1½ hour to a solution of 0.13 mol. of 2,3-dimethyl-maleic anhydride in 150 cc. toluene kept at a temperature of —70° C. The solution was kept at this temperature for one hour, after which the reaction mixture was allowed to warm up to —10° C. At this temperature, 100 cc. of a 20% aqueous solution of $NH_4Cl$ was added. Two layers were obtained, an aqueous layer, which was washed once with a small quantity of toluene and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude lactonol thus obtained was fractionated under vacuum. The pure lactonol thus obtained in an amount of about 0.1 mol. was converted into the corresponding lactone by dehydration with a mixture of acetic anhydride, glacial acetic acid and concentrated sulphuric acid.

The lactone was extracted with petroleum ether, the petroleum ether solution was washed until it gave a neutral reaction, the petroleum ether was distilled off and finally the lactone was distilled under vacuum.

The characteristics of the pure lactones and the pure lactonols are given in Table II below. In these compounds $R_1$ and $R_2$ are methyl groups and $R_3$ and $R_4$ are as defined in column 1 of the table.

*Table II*

LACTONES

| | B Pt., °C./mm. | M. Pt., °C. | $n_D^{20}$ | U.V., max in petr. ether |
|---|---|---|---|---|
| $R_4$ | | | | |
| $(CH_3)_2CH.CH_2.CH=$ | 72/0.15 | | 1.5098 | 270 |
| $(CH_3.CH_2)_2.C=$ | 84/0.2 | | 1.5350 | 282 |
| $\overline{CH_2.(CH_2)_4.C}=$ | | 73 | | 282 |
| $\overline{CH_2.(CH_2)_4.CH.CH}=$ | | 76 | | 273 |

LACTONOLS

| $R_3$ | | | | |
|---|---|---|---|---|
| $(CH_3)_2CH.CH_2.CH_2-$ | 120/0.2 | | 1.4721 | 213 |
| $(CH_3.CH_2)_2.CH-$ | | 69 | | 208 |
| $\overline{CH_2.(CH_2)_4.CH}-$ | | 158.5 | | 214 |
| $\overline{CH_2.(CH_2)_4.CH.CH_2}-$ | 140/0.06 | 67 | | 216 |

EXAMPLE 3

This example illustrates the preparation of 3,4-dimethyl-5-hydroxy-5-aralkyl-2,5-dihydro-furane-2-ones and the corresponding lactones.

The starting materials used were 2,3-dimethyl-maleic anhydride, phenyl-methyl magnesium bromide and 2'-phenyl-ethyl-alkyl magnesium bromide.

150 cc. of a solution of the alkyl magnesium bromide in ether, containing 0.15 mol. of the bromide and having a temperature of about 20° C. was added in 1½ hour to a solution of 0.13 mol. of 2,3-dimethyl-maleic anhydride in 150 cc. toluene kept at a temperature of —70° C. The solution was kept at this temperature for one hour, after which the reaction mixture was allowed to warm up to —10° C. At this temperature 100 cc. of a 20% aqueous solution of $NH_4Cl$ was added. Two layers were obtained, an aqueous layer, which was washed once with a small quantity of toluene and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude lactonol thus obtained was fractionated under vacuum. The pure lactonol thus obtained in an amount of about 0.1 mol. was converted into the corresponding lactone by dehydration with a mixture of acetic anhydride, glacial acetic acid and concentrated sulphuric acid.

The lactone was extracted with petroleum ether, the petroleum ether solution was washed until it gave a neutral reaction, the petroleum ether was distilled off and finally the lactone was distilled under vacuum.

The characteristics of the pure lactones and the pure lactonols are given in the Table III below. In these compounds $R_1$ and $R_2$ are methyl groups and $R_3$ and $R_4$ are as defined in column 1 of the table.

Table III

LACTONES

| $R_4$ | M. Pt., °C. | U.V., max. in petr. ether |
|---|---|---|
| $C_6H_5CH_2CH=$ | 36.5 | 274 |
| $C_6H_5CH=$ | 119 | 322 |

LACTONOLS

| $R_3$ | | |
|---|---|---|
| $C_6H_5.CH_2.CH_2-$ | 92.5 | 216 |
| $C_6H_5.CH_2-$ | 76 | 217 |

The lactones of Example 3 have odors reminiscent of violets and balsam. They are useful in perfumery.

EXAMPLE 4

This example relates to the preparation of 3.4-dimethyl-5-(3'-phenylpropene-2'-ylidene)-2:5-dihydro-furane-2-one.

The starting materials used were 2.3-dimethyl-maleic anhydride and the sodium salt of phenylisocrotonic acid.

10 g. 2.3-dimethyl maleic anhydride and 15 g. of the sodium salt of phenylisocrotonic acid were heated by means of an oil-bath to 150° C. and 16 cc. acetic anhydride were added dropwise in half an hour. A homogeneous brown mass was obtained which was boiled for a quarter of an hour. After cooling, during which the lactone crystallizes in yellow needles the reaction product is extracted with a solution of sodium carbonate. The remaining yellow powder was extracted with cold alcohol. Thus 10 g. of pure lactone was obtained.

This compound was of melting point 153° C. and the U.V.-absorption spectrum of a solution of the compound in petroleum ether showed a maximum at $\lambda=352$.

EXAMPLE 5

This example illustrates the preparation of 3.4-diethyl-5-hydroxy-5-butyl-2:5-dihydro-furane-2-one, and certain higher homologues, and the corresponding lactones.

The starting materials used were 2.3-diethyl-maleic anhydride and an n-alkyl magnesium bromide, the alkyl group being either n-butyl, n-pentyl or n-hexyl.

150 cc. of a solution of n-alkyl magnesium bromide in ether, containing 0.15 mol. of the bromide and having a temperature of about 20° C. was added in 1½ hour to a solution of 0.13 mol. of 2.3-diethyl-maleic anhydride in 150 cc. toluene kept at a temperature of −70° C. The solution was kept at this temperature for one hour, after which the reaction mixture was allowed to warm up to −10° C. At this temperature 100 cc. of a 20% aqueous solution of NH₄Cl was added. Two layers were obtained, an aqueous layer which was washed once with a small quantity of toluene and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude lactonol thus obtained was fractionated under vacuum. The pure lactonol thus obtained in an amount of about 0.1 mol. was converted into the corresponding lactone by dehydration with a mixture of acetic anhydride, glacial acetic acid and concentrated sulphuric acid.

The lactone was extracted with petroleum ether, the petroleum ether solution was washed until it gave a neutral reaction, the petroleum ether was distilled off and finally the lactone was distilled under vacuum.

The characteristics of the lactones and the pure lactonols are given in the Table IV below. $R_1$ and $R_2$ are ethyl groups and $R_3$ and $R_4$ are unbranched acylic radicals as defined in column 1.

Table IV

LACTONES

| $R_4$ | B. Pt., °C./mm. | $n_D^{20}$ | U.V., max. in petr. ether |
|---|---|---|---|
| $C_4H_9$ | 69–74/0.1 | | 270 |
| $C_5H_{10}$ | 78–85/0.06 | 1.5032 | 270 |
| $C_6H_{12}$ | 105–113/0.1 | | 270 |

LACTONOLS

| $R_3$ | | | |
|---|---|---|---|
| $C_4H_9$ | 114–115/0.065 | 1.4722 | 210 |
| $C_5H_{11}$ | 114–115/0.065–0.0045 | 1.4720 | 218 |
| $C_6H_{13}$ | 123–124/0.061 | 1.4747 | 218 |

EXAMPLE 6

This example illustrates the preparation of a mixture of 3- and 4-methyl-5-hydroxy-5-pentyl-2:5-dihydro-furane-2-one and its dehydration product, a mixture of 3- and 4-methyl-5-pentylidene-2:5-dihydro-furane-2-ones.

The starting materials used were methyl-maleic anhydride and pentyl magnesium bromide.

150 cc. of a solution of pentyl magnesium bromide in ether, containing 0.15 mol of the bromide and having a temperature of about 20° C. was added in 1½ hours to a solution of 0.13 mol. of methyl-maleic acid anhydride in 150 cc. toluene kept at a temperature of −70° C. The solution was kept at this temperature for one hour, after which the reaction mixture was allowed to warm up to −10° C. At this temperature 100 cc. of a 20% aqueous solution of NH₄Cl was added. Two layers were obtained, an aqueous layer, which was washed once with a small quantity of toluene and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude mixture of lactonols thus obtained was fractionated under vacuum. The mixture of pure lactonols thus obtained in an amount of about 0.1 mol. was converted into the corresponding lactone mixture by dehydration with a mixture of acetic anhydride, glacial acetic acid and concentrated sulphuric acid.

The lactone mixture was extracted with petroleum ether, the petroleum ether solution was washed until it gave a neutral reaction, the petroleum ether was distilled off and finally the lactone mixture was distilled under vacuum.

The mixture of pure lactonols boiled at 126° C. under 0.22 mm., was of refractive index $n_D^{20}=1.4818$ and showed a U.V. maximum in petroleum ether at $\lambda=211$. The mixture of pure lactones boiled at 100–110° C. under 0.2 mm. and showed a U.V. maximum at $\lambda=273$.

EXAMPLE 7

This example illustrates the preparation of 3.4-dibutyl-5-hydroxy-5-pentyl-2:5-dihydro-furane-2-one and the corresponding lactone.

The starting materials used were 2.3-dibutyl-maleic anhydride and n-pentyl magnesium bromide.

150 cc. of a solution of n-pentyl magnesium bromide in ether, containing 0.15 mol. of the bromide and having a temperature of about 20° C. was added over 1½ hours to a solution of 0.13 mol. of 2.3-dibutyl maleic anhydride in 150 cc. toluene kept at a temperature of −70° C. The solution was kept at this temperature for one hour, after which the reaction mixture was allowed to warm up to −10° C. At this temperature 100 cc. of a 20% aqueous solution of NH₄Cl was added. Two layers were obtained, an aqueous layer, which was washed once with a small quantity of toluene and a toluene layer, to which was added the fore-mentioned small quantity of toluene used for washing the aqueous layer. This toluene fraction was dried over anhydrous sodium sulphate. After distilling off the solvent under a vacuum of about 30 mm. the crude lactonol thus obtained was fractionated under vacuum. The pure lactonol thus obtained in an amount of about 0.1 mol. was converted into the corresponding lactone by dehydration with a mixture of acetic anhydride, glacial acetic acid and concentrated sulphuric acid.

The lactone was extracted with petroleum ether, the petroleum ether solution was washed until it was neutral in reaction, the petroleum ether was distilled off and finally the lactone was distilled under vacuum.

The lactonol boiled at 150–155° C. under 0.2 mm. and was of refractive index $n_D^{20}=1.4690$. The lactone boiled at 125–128° C. under 0.2 mm. and was of refractive index $n_D^{20}=1.4874$.

An important use for the lactonols of the invention is in the preparation of the lactones of the invention. In addition they provide new heavy-metal sequestering agents.

The lactones of the invention provide new heavy-metal sequestering agents, anti-oxidants and agents for use in perfumery and/or flavouring. Most of the non-aromatic lactones of the invention (for instance 3:4-dimethyl-5-pentylidene-2:5-dihydro-furane-2-one, the corresponding 5-propylidene-, 5-butylidene, 5-hexylidene- and 5-cyclohexylidene- derivatives, and the 3:4-diethyl and 3-methyl- and 4-methyl derivatives corresponding to all these 3:4-dimethyl derivatives) have a celery-like flavour in appropriate concentration.

We claim:

1. A gamma-alkylidene alpha-beta unsaturated gamma lactone of the formula:

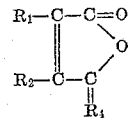

where $R_1$ and $R_2$ are radicals selected from the group consisting of hydrogen and unsubstituted alkyl of 1 to 5 carbon atoms, at least one of said $R_1$ and $R_2$ radicals being such alkyl; and $R_4$ is a hydrocarbon radical selected from the group consisting of unsubstituted alkylidene radicals having from 2 to 7 carbon atoms, unsubstituted cycloalkylidene radicals having 6 carbon atoms, unsubstituted cycloalkylalkylidene radicals having 7 carbon atoms and unsubstituted alkenylalkylidene radicals having 4 carbon atoms.

2. A gamma-alkylidene alpha-beta unsaturated gamma lactone which is 3,4-dimethyl-5-pentylidene-2,5-dihydro-furane-2-one.

3. A gamma-alkylidene alpha-beta unsaturated gamma lactone which is 3,4-diethyl-5-pentylidene-2,5-dihydro-furane-2-one.

4. A gamma-alkylidene alpha-beta unsaturated gamma lactone which is 3,4-dibutyl-5-pentylidene-2,5-dihydro-furane-2-one.

5. A gamma-alkylidene alpha-beta unsaturated gamma lactone which is 3,4-dimethyl-5-propylidene-2,5-dihydro-furane-2-one.

6. A gamma-alkylidene alpha-beta unsaturated gamma lactone which is 3,4-dimethyl-5-heptylidene-2,5-dihydro-furane-2-one.

7. A gamma-alkylidene alpha-beta unsaturated gamma lactone which is 3,4-dimethyl-5-cyclohexylidene-2,5-dihydro-furane-2-one.

8. A gamma-alkylidene alpha-beta unsaturated gamma lactone which is 3,4-dimethyl-5-butylidene-2,5-dihydro-furane-2-one.

9. A gamma-alkylidene alpha-beta unsaturated gamma lactone which is 3,4-dimethyl-5-hexylidene-2,5-dihydro-furane-2-one.

10. A process for the preparation of a gamma-alkylidene alpha-beta unsaturated gamma lactone comprising reacting together a maleic anhydride of the formula

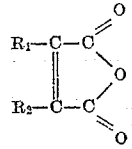

with an addition reagent selected from the group consisting of $R_3MgX$, $R_3ZnX$, and $R_3CdR_3$, the reaction being effected by bringing the reactants into contact at a temperature not substantially above −70° C. in solution in a liquid inert reaction medium and maintaining said low temperature for not substantially less than one hour; hydrolyzing the resulting addition product by contacting it at a temperature in the neighborhood of −10° C. with an aqueous solution of an inorganic salt to form a gamma-hydroxy lactone of the formula

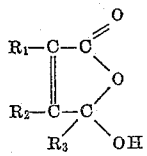

and dehydrating said gamma-hydroxy lactone with a dehydrating agent selected from the group consisting of acetic anhydride, glacial acetic acid and concentrated sulphuric acid to form a gamma-alkylidene alpha-beta unsaturated gamma lactone of the formula

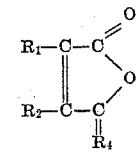

where $R_1$ and $R_2$ are radicals selected from the group consisting of hydrogen and unsubstituted alkyl of 1 to 5 carbon atoms, at least one of said $R_1$ and $R_2$ radicals being such alkyl; $R_3$ is a hydrocarbon radical selected from the group consisting of unsubstituted alkyl radicals having from 2 to 7 carbon atoms, unsubstituted cycloalkyl radicals having 6 carbon atoms, unsubstituted cycloalkylalkyl radicals having 7 carbon atoms, and unsubstituted alkenyl radicals having 4 carbon atoms; $R_4$ is a hydrocarbon radical selected from the group consisting of unsubstituted alkylidene radicals having from 2 to 7 carbon atoms, unsubstituted cycloalkylidene radicals having 6 carbon atoms, unsubstituted cycloalkylalkylidene radicals having 7 carbon atoms, and unsubstituted alkenylalkylidene radicals having 4 carbon atoms; and X is a halogen selected from the group consisting of chlorine and bromine.

References Cited in the file of this patent

Wiezmann et al.: Journ. Amer. Chem. Soc., vol. 60, page 2647 (1938).

Gilman et al.: Chem. Abstracts, vol. 45, page 1575 (1951).

Fieser et al.: Organic Chemistry, 3rd Ed., New York (1956), page 806.